United States Patent [19]
Worley

[11] 3,777,427
[45] Dec. 11, 1973

[54] WALL CONSTRUCTION DEVICE

[76] Inventor: Raymond Arnold Worley, 600 Checker Dr., Buffalo Grove, Ill. 60090

[22] Filed: Sept. 21, 1972

[21] Appl. No.: 291,057

[52] U.S. Cl............... 52/127, 52/221, 52/302
[51] Int. Cl................................ E04f 17/08
[58] Field of Search............... 52/127, 221, 302; 138/92; 174/48, 58; 220/3.8

[56] References Cited
UNITED STATES PATENTS

| | | | |
|---|---|---|---|
| 1,540,330 | 6/1925 | Hartmann | 174/58 |
| 1,713,890 | 5/1929 | Clark | 52/37 X |
| 3,090,587 | 5/1963 | Peterson | 248/27 |
| 3,255,563 | 6/1966 | Sauer | 52/221 |
| 3,620,404 | 11/1971 | Grasso | 174/48 |

FOREIGN PATENTS OR APPLICATIONS

| | | | |
|---|---|---|---|
| 1,201,693 | 7/1959 | France | 52/221 |
| 1,279,036 | 11/1961 | France | 52/221 |

Primary Examiner—Alfred C. Perham
Attorney—Roy H. Olson et al.

[57] ABSTRACT

An access device is provided for plugging openings formed in walls or like structures which lead to utility connection points. The access device includes a housing mounted within the wall and defining the perimeter of the wall opening, and a plug box having two plates which can be locked in positions coplanar with the surrounding wall surfaces. The plate locking device comprises a tongue carried by the plug box which can be rotated into locking engagement with a slot formed in the housing.

9 Claims, 8 Drawing Figures

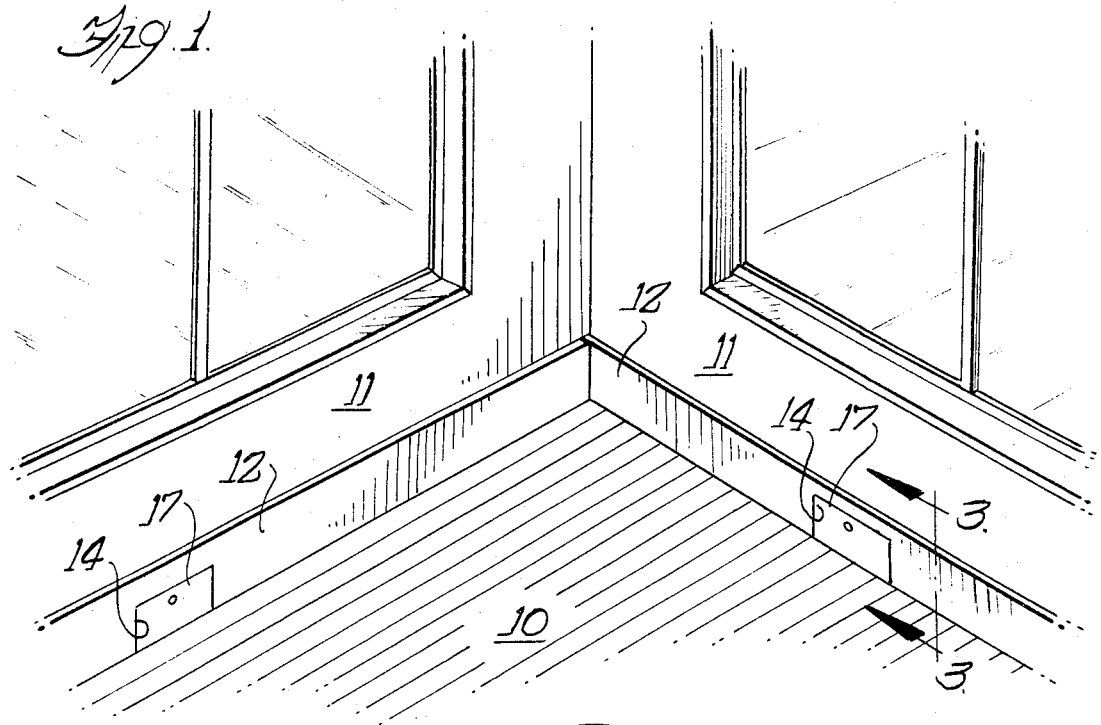
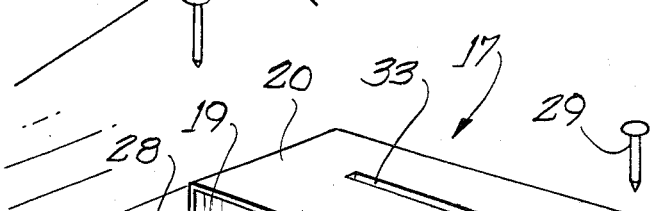
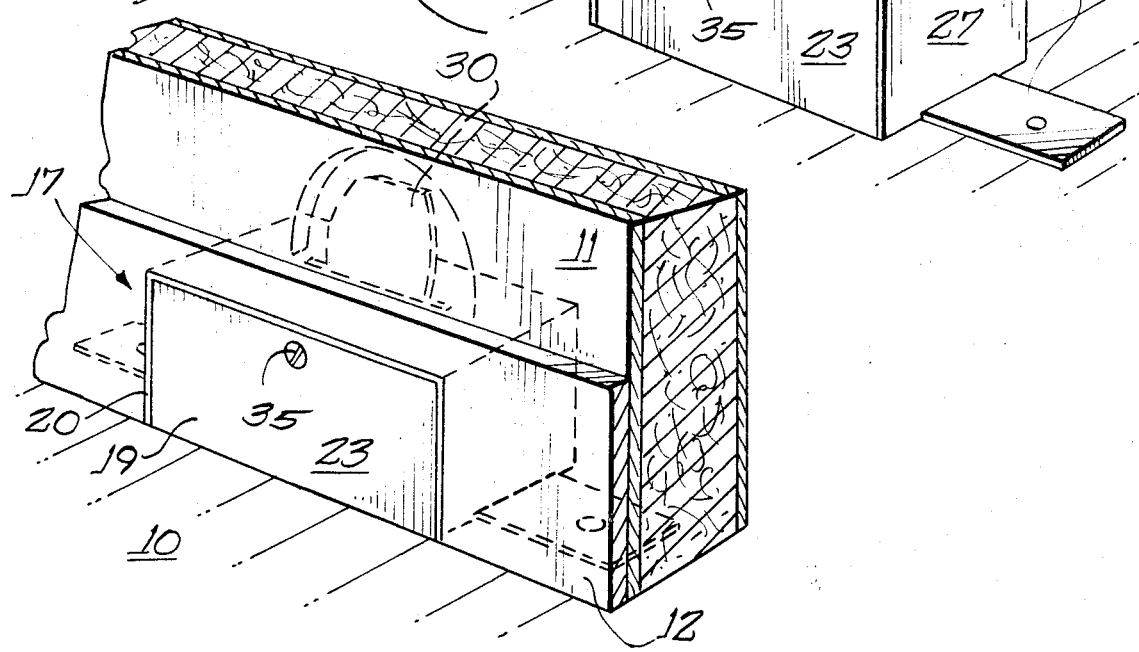

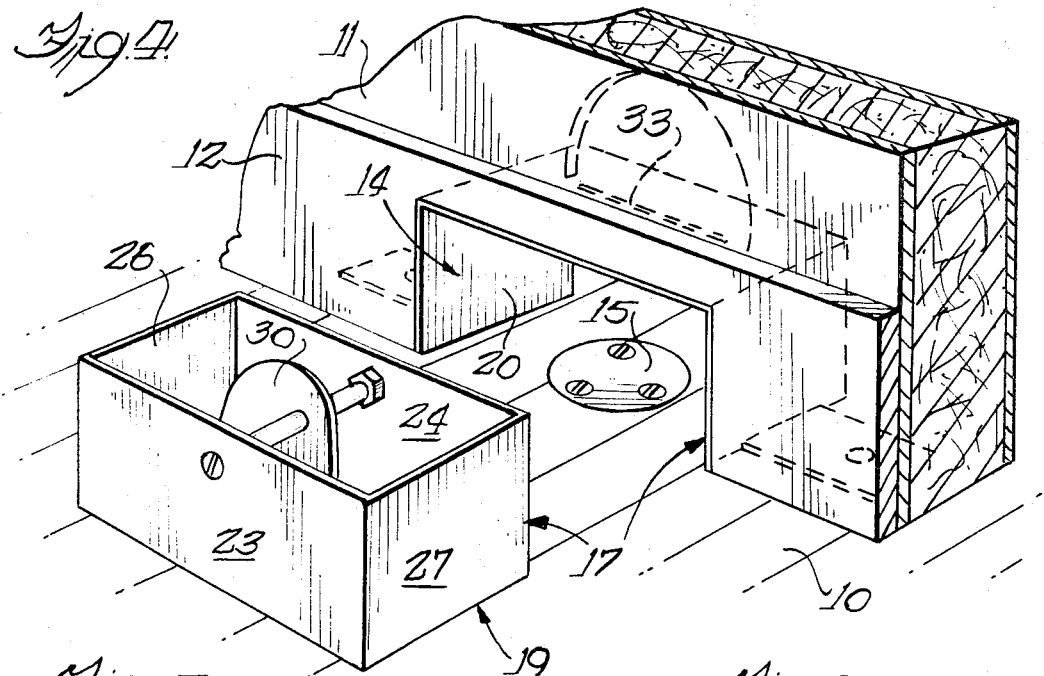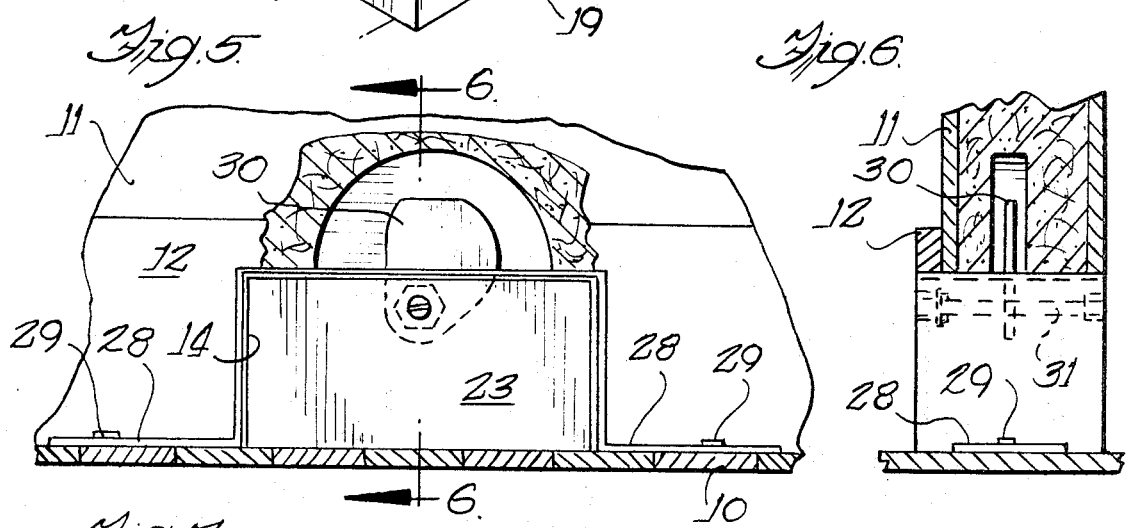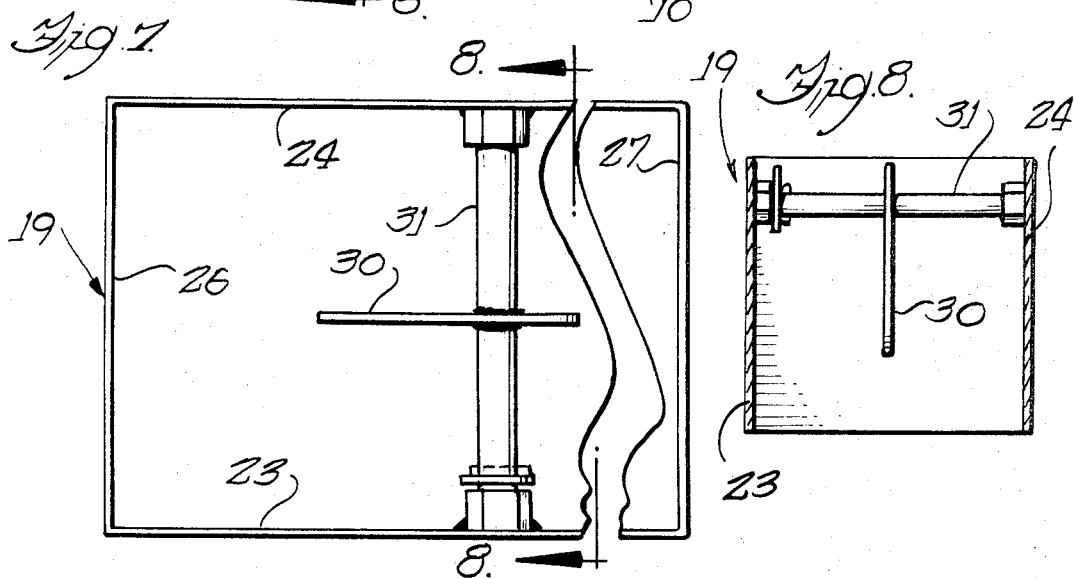

WALL CONSTRUCTION DEVICE

Background of the Invention

This invention relates generally to wall construction devices, and more particularly concerns devices used for providing access to utility outlets which are located in a floor and underneath a wall.

In constructing modern office buildings, industrial plants and similar facilities, progressive construction practice often utilizes modular construction. The practice in modular construction is to provide regularized planar areas, or modules, with all necessary utilities and environmental services, and then to provide wall units for semi-permanent installation around the module perimeters. For example, a module shape of 5 feet by 10 feet may be first selected by the building designer, and then each such module on an office floor space under construction is provided with all necessary environmental services such as heating, air conditioning, lighting, and all necessary utilities including electric and telephone wires. Thereafter, pre-constructed interior wall units can be easily installed along selected module perimeters to fit the particular space requirements of any tenant. In the above example, a series of offices could be created for a tenant organization by simply installing interior wall units along the periphery of each module, thereby creating offices measuring substantially 5 feet by 10 feet in dimension, and each such office would by provided with all necessary lighting, air conditioning, heating, and utility services. At a later time, if the floor space requirements of the tenant organization were to change, the floor plan and work area of the tenant organization could be easily changed by simply rearranging the interior walls. For example, wall units between several of the described 5-by-10 offices could be removed, thereby creating an open work space measuring 10 feet by 10 feet, or 10 feet by 15 feet, or any other dimensions, the only restriction being that such space must be created in integral modular unit increments.

In modular construction schemes such as this, it is common practice to install electric, telephone, and other utility lines in channels or conduits located in the floor or ceiling of the newly constructed space. Connection points permitting telephone hookups or electric plug box attachments are then provided at regularized intervals along each utility channel. Thus, in the above example of modular construction, utility conduits might be installed in the floor every 10 feet, and connection points providing openings into the channels could be located every 2 or 3 feet along each channel, thereby providing a grid of regularly spaced connection points under the entire newly constructed floor.

To prevent connection point caps or cover plates from protuding unnecessarily above the floor space, the connection points themselves are often located directly underneath the module perimeters; i.e., directly below those locations where interior walls may be semi-permanently installed.

When interior walls are subsequently installed, however, the covered-over-connection points have, until now, been rendered virtually inaccessible. To reach these connection points, the telephone or electrical installer was required to remove portions of the wall unit adjacent the connection point, or break away portions of the wall baseboard.

This effort on the part of the electrical or telephone installer is expensive and time consuming, in direct contrast to the theory of modular construction. Often it has been necessary to discard the penetrated wall units when revising the modular floor plans, thereby adding to the expense of remodeling.

Similar difficulties have been encountered in non-modular construction. In building or remodeling housing, office, or industrial structures, it is often convenient to route electric, telephone and other utility cables along the base of new wall construction. Again, however, access to such cables is made difficult and expensive by the necessity of removing either a portion of the wall or the wall baseboard in order to provide a connection point for desired electrical outlet boxes or telephone hookup points. The permanent damage of alterations thus done to the walls is often difficult and expensive to repair, and the wall is reconstructed only with relative difficulty when it is desired to remove the installed telephone or electrical connection box. The repair work is often expensive, time consuming, difficult, and does not always present a neat, unobtrusive appearance.

It is therefore the general object of the present invention to provide an inexpensive device which will provide easy and quick access to utility connection points located directly underneath walls without permanent damage being done to the wall.

It is another object of the invention to provide an inexpensive device for use with utility connection points located below a wall, whereby the connection points can be quickly reached when desired, and whereby the wall surface or baseboard can be closed off and provided with a smooth, uniform appearance when access to the connection points is unnecessary.

Other objects and advantages of the invention will be apparent upon reading the following detailed description and upon reference to the drawings.

FIG. 1 is a perspective view showing in general form a typical floor and wall structure wherein the novel access device of the present invention is installed;

FIG. 2 is a perspective view showing in further detail the access device;

FIG. 3 is a fragmentary sectional view taken substantially in the plane of line 3—3 in FIG. 1 and showing the access device installed in a typical wall construction adjacent the floor;

FIG. 4 is a perspective similar to FIG. 3 and showing the access device with a plug member removed;

FIG. 5 is an elevational view showing in further detail the access device as it is installed in a typical wall immediately over the adjacent floor, and showing in further detail the locking device whereby the plug member is secured within the wall;

FIG. 6 is a sectional view taken substantially in the plane of line 6—6 in FIG. 5 and showing in further detail the access device, the adjacent wall and floor, and the locking device securing the plug member in the wall;

FIG. 7 is a plan view showing in further detail the plug member and the associated locking mechanism;

FIG. 8 is a sectional elevational view taken substantially in the plane of line 8—8 in FIG. 7 and showing in further detail the plug member and locking mechanism associated therewith.

While the invention will be described in connection with a preferred embodiment, it wil be understood that it is not intended to limit the invention to that embodiment. On the contrary, it is intended to cover all alternatives, modifications, and equivalents as may be included within the spirit and scope of the invention. Throughout the following description, like reference numerals refer to like parts in all the figures.

Turning first to FIG. 1, there is shown a typical room construction including a floor 10 and adjacent perpendicular walls 11. If desired, these walls 11 may be provided with baseboards 12 of known construction. Openings 14 are formed in the baseboards 12 and walls 11 adjacent the floor 10 to provide access to connection points of utility lines (not shown) located within the floor 10. As illustrated in FIGS. 1, 3, 4 and elsewhere, the utility lines can be reached through the openings 14 and a handhole formed in the floor surface and covered by a cover plate 15. It is contemplated that these openings 14 may be provided not only in a wall 11 adjacent a floor 10, but in any first planar member when covered by a second planar member oriented perpendicularly to the first member. For example, the openings could, if desired, be formed in a wall at a location adjacent a ceiling if it were deemed desirable to provide a grid of connection points for overhead lights.

As may be more fully seen in FIGS. 2–8, the access device 17 for use with the openings 14 may be considered to include a plug 19 and a housing 20. In the illustrated embodiment, the plug 19 is formed in the shape of an open box and includes two outer plates 23 and 24 having a height and a width substantially equal to the opening 14 formed in the wall and spaced apart a distance substantially equal to the thickness of the opening. To pre-position these outer plates 23 and 24 in the desired spaced apart positions, one or more connecting webs 26 and 27 may be provided. It is within the purview of the invention that any number of connecting webs 26 and 27 may be provided in the interests of economy and manufacturing ease. For example, one or both of the webs 26 and 27 could be eliminated and a top or bottom connecting web substituted therefor if clearances within the opening 14 permitted and if desirable manufacturing economies could be effected. However, if the cover plate 15 protrudes a substantial distance above the top of the floor 10, the box bottom could be eliminated and an accommodation slot (not shown) can be provided in either or both of the plates 23 and 24.

The housing member 20 may be formed of metal or other convenient material and is shaped to define the periphery or perimeter of the wall opening 14. If desired, this housing member 17 may be mounted to the floor 10 by any convenient means, such as the ears 28 and associated screws 29.

When the plug 19 is inserted within the housing 20 as illustrated in FIGS. 3, 5, and 6, the plates 23 and 24 are located in plugging positions substantially coplanar with the surrounding surface of the wall itself, or of the surrounding baseboard 12. A neat, planar, finished appearance is thus present, and dirt and other foreign matter is excluded from the utility channel and connections.

To lock the outer plates 23 and 24 and plug box 19 in the described plugging position, an inexpensive yet reliable locking device can be provided. In the illustrated embodiment the locking device includes a tongue member 30 mounted between the connected plate members 23 and 24 for rotation upon an axle 31. A corresponding slot 33 is formed in the housing member 20 to accommodate the tongue member 30 when it is rotated into its locking position. Rotation of the tongue member 30 between the locked and unlocked positions is accomplished through a lock actuating means provided upon the axle 31. In the illustrated embodiment, this actuating means comprises a slot 35 formed in the axle end to accommodate the blade of a screwdriver or a like driving device. After the plug box 19 is pushed into its plugging position a screwdriver may be inserted in the slot 35, and the tongue 30 rotated into engagement with the slot 33 formed in the housing member 17.

The following is claimed as invention:

1. An access device for use with a connection point formed in a first planar member and covered by a second planar member, the second planar member being oriented substantially perpendicular to the first planar member and having a predetermined thickness defined by two opposed outer surfaces, said second planar member having an opening in its surfaces formed adjacent said first planar member to provide access to the connection point, said access device comprising, in combination, a first plate member for substantially plugging the opening in one of said second planar member surfaces, a second plate member for substantially plugging the opening in the second of said second planar member surfaces, connecting means connecting said first and second plate members and spacing apart the plate members a predetermined distance, locking means carried between the connected plate members or locking the connected plate members in their respective plugging positions, and actuating means for moving the locking means between a locked position and an unlocked position permitting the plate members to be removed from the second planar member, thereby exposing the connection point.

2. An access device for use with a connection point formed in a floor and covered by a wall positioned thereover, the wall having two spaced apart opposed outer surfaces and an opening formed in the bottom thereof adjacent the floor providing the access to the connection point, said access device comprising, in combination, a first plate member for substantially plugging the opening formed in the wall when located in a position substantially coplanar with one wall surface, a second plate member for substantailly plugging the opening formed in the wall when located in a position substantially coplanar with the second wall surface, connecting means connecting said plate members and spacing said plate members apart at a distance substantially equal to the thickness of the wall adjacent the wall opening, locking means carried between the connecting plate members for locking the plate members in their plugging positions, and actuating means for moving the locking means between a locked position and an unlocked position permitting the plate members to be removed from the wall, thereby exposing the connection point.

3. A device according to claim 2 including slot means mounted within said wall for engagement by said locking means, and wherein said locking means includes axle means, and tongue means mounted on said axle means for rotation between an unlocked position and a locked position wherein said tongue means engages said slot means.

4. A device according to claim 2 wherein said actuating means comprises a slot formed in the end of said axle means for accommodating the blade of a screwdriver or like driving device, thereby permitting the locking means to be rotated from a locked to an unlocked position upon corresponding rotation of an inserted screwdriver blade.

5. A device according to claim 2 wherein said first plate member, said second plate member, and said connecting means comprise an open box structure having a depth substantially equal to the wall thickness and a height and width substantially equal to the opening formed in the wall.

6. A device according to claim 2 including housing means for mounting within said opening formed within the wall, the housing means when so mounted defining the outer periphery of said opening, said housing means having formed therein a locking slot shaped to engage said locking means and secure said access device in a plugging position within the wall opening when said locking means is rotated into the locked position.

7. A device according to claim 6 wherein said housing means is provided with at least one ear for mounting said housing means to the adjacent floor.

8. An access device for use with a connection point formed in a floor and substantially covered by a perpendicular wall positioned over said floor and connection point, the wall having an opening formed in the bottom thereof for providing access to the connection point, said access device comprising, in combination, housing means for relatively permanent attachment to said floor member and defining the perimeter of the opening in said wall member, plug means formed in the shape of a box having two outer plates spaced apart substantially the width of the wall opening thickness for location in respective plugging positions substantially coplanar with the surrounding wall surfaces, and locking means for locking the box plug member within the wall opening so as to position the outer plate members in the defined plugging locations.

9. A device according to claim 8 wherein said locking means comprises axle means and a tongue member mounted for rotation by the axle means into a locking position engaging said housing means, said housing means having formed therein a slot formed to accommodate the protruding locking means tongue member.

* * * * *